(12) United States Patent
Miyoshi (10) Patent No.: US 9,185,420 B2
(45) Date of Patent: Nov. 10, 2015

(54) MOVING IMAGE CODING APPARATUS AND MOVING IMAGE CODING METHOD

(75) Inventor: Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 866 days.

(21) Appl. No.: 12/717,400

(22) Filed: Mar. 4, 2010

(65) Prior Publication Data

US 2010/0226433 A1    Sep. 9, 2010

(30) Foreign Application Priority Data

Mar. 6, 2009   (JP) ................................. 2009-053913

(51) Int. Cl.
| | | |
|---|---|---|
| H04N 19/177 | (2014.01) | |
| H04N 19/159 | (2014.01) | |
| H04N 19/149 | (2014.01) | |
| H04N 19/126 | (2014.01) | |

(52) U.S. Cl.
CPC ........... *H04N 19/177* (2014.11); *H04N 19/126* (2014.11); *H04N 19/149* (2014.11); *H04N 19/159* (2014.11)

(58) Field of Classification Search
CPC . H04N 19/126; H04N 19/149; H04N 19/159; H04N 17/177
USPC .......................... 375/240.12–240.26, E07.246
IPC ......................................................... H04N 7/32
See application file for complete search history.

(56) References Cited

U.S. PATENT DOCUMENTS

| | | | |
|---|---|---|---|
| 6,118,818 A | | 9/2000 | Min et al. |
| 6,205,484 B1 * | | 3/2001 | Eriksson ....................... 709/229 |
| 8,040,947 B2 * | | 10/2011 | Nakagomi et al. ........ 375/240.02 |
| 8,107,529 B2 * | | 1/2012 | Tanaka et al. ............. 375/240.06 |
| 8,184,694 B2 * | | 5/2012 | Srinivasan ................ 375/240.03 |
| 2005/0147162 A1 * | | 7/2005 | Mihara ..................... 375/240.03 |
| 2006/0013307 A1 | | 1/2006 | Olivier et al. |
| 2006/0171460 A1 * | | 8/2006 | Masuda et al. ........... 375/240.03 |
| 2008/0279275 A1 * | | 11/2008 | Suzuki ..................... 375/240.03 |
| 2009/0074052 A1 * | | 3/2009 | Fukuhara et al. ......... 375/240.01 |
| 2009/0161758 A1 * | | 6/2009 | Shimazu et al. ......... 375/240.03 |

FOREIGN PATENT DOCUMENTS

| | | |
|---|---|---|
| JP | 9-214976 | 8/1997 |
| JP | 9-284779 | 10/1997 |
| JP | 2006-25428 | 1/2006 |

OTHER PUBLICATIONS

Takahiko Fukinuki, "Sharp/Blurred Sampled Motion Pictures and Its Application to Picture Coding~Extension of the Signal Processing of Motion Visual Perception~", PCSJ2007/IMPS2007, No. P3-03, Oct. 31, 2007.

* cited by examiner

*Primary Examiner* — Tung Vo
(74) *Attorney, Agent, or Firm* — Staas & Halsey LLP (57) ABSTRACT

A moving image coding apparatus is provided. The moving image coding apparatus includes a processing unit having an information amount control processor determining a quantization parameter in such a manner that while a lead-in of the set of the pictures is set as a reference, upon a position of the inter-coded picture being after a predetermined position corresponds to a first position at a predetermined cycle shorter than the number of pictures included in the set of the pictures, the number of coding bits allocated to the inter-coded picture is a value obtained by adding a first predetermined amount to a predetermined reference value, and upon the position of the inter-coded picture being after the predetermined position and also at a second position different from the first position, the number of coding bits is a value obtained by subtracting a second predetermined amount from the reference value.

11 Claims, 6 Drawing Sheets

MOVING IMAGE CODING APPARATUS AND MOVING IMAGE CODING METHOD

CROSS-REFERENCE TO RELATED APPLICATION(S)

This application is related to and claims priority to Japanese Patent Application No. 2009-53913 filed on Mar. 6, 2009, and incorporated herein by reference.

BACKGROUND

1. Field

The embodiments discussed herein are directed to a moving image coding apparatus and a moving image coding method for intra-coding particular images and inter-coding the other images.

2. Description of the Related Art

Moving image data generally has an extremely large data amount. In upon an apparatus dealing with the moving image data attempts to send the moving image data to another apparatus or store the moving image data in a storage apparatus, the apparatus compresses the moving image data. Coding methods employed for compressing the moving image data include an intra-coding method and an inter-coding method. The intra-coding method is a method of using only information included in one picture of a coding target and coding the relevant picture. This method is also referred to as intra-frame coding method or intra-picture coding method. On the other hand, the inter-coding method is a method of using information on a picture of a coding target and information of previous and subsequent pictures and coding the picture of the coding target According to the inter-coding method, the picture of the coding target is divided into a plurality of blocks. With respect to the respective blocks, from pictures obtained by decoding already coded previous and subsequent pictures, a most similar area is selected, and difference information between the respective blocks and the selected similar area is obtained. The difference information and motion vector information representing amounts at which the respective blocks are moved from the similar area are coded. For that reason, according to the inter-coding method, as redundant information can be removed, it is possible to achieve a compression efficiency higher than a compression efficiency based on the intra-coding method.

In contrast to this, according to the intra-coding method, in general, it is possible to reduce an error between the decoded picture obtained by decoding the coded data and the original picture. For that reason, an apparatus for reproducing the compressed coded moving image data can decode a picture with a high sharpness from the coded data according to the intra-coding method. On the other hand, according to the inter-coding method, as described above, only the difference information between the previous and subsequent pictures and the motion vector information are coded. If an error is included when any one of pictures is coded, the error propagates in other pictures after the relevant picture. In view of the above, in order to suppress the propagation of the coding error, a coding method of carrying out the intra-coding at a constant frequency is proposed. Such a coding method is, for example, adopted in standards such as ISO (International Organization for Standardization) Moving Picture Experts Group phase 2 (MPEG-2), MPEG-4, or ITU-T (International Telecommunication Union Telecommunication Standardization Sector) H.264/MPEG-4 Advanced Video Coding (H.264/MPEG-4 AVC). It should be noted that with regard to a plurality of continuous pictures repeated at this constant frequency, a coding method for the respective pictures is defined as Group Of Pictures (GOP). Also, hereinafter, among the pictures included in the GOP, a picture to be intra-coded is referred to as I-picture. Furthermore, a picture to be inter-coded by using the information on the temporally previous picture is referred to as P-picture. Furthermore, a picture to be inter-coded by using both the information on the temporally previous picture and the information on the temporally subsequent picture is referred to as B-picture. It should be noted that the picture is a frame or a field. The frame is one still image in the moving image data, and on the other hand, the field is a still image obtained by taking out only data in an odd-numbered row or data in an even-numbered row from the frame. A field having only the data in an odd-numbered row and a field having only the data in an even-numbered row are respectively referred to as top field and bottom field in the present specification.

A Constant Bit Rate (CBR) coding method is adopted in a system such as a digital broadcasting system having a high demand with respect to a real-time feature with regard to a moving image data distribution. This CBR coding method is a coding method of allocating a constant bit length to the coded moving image data for every unit of time. At this time, the I-picture located at the lead-in of the GOP functions as a reference for inter-coding other P-picture or B-picture. However, the compression efficiently of the intra-coding method is lower than the compression efficiently of the inter-coding method. In order to reduce the coding error of the I-picture as much as possible, it is necessary to allocate the I-picture with a larger information amount, that is, a larger number of coding bits. If the I-picture is allocated with many coding bits, as the number of bits per unit of time is decided in the CBR coding method, the number of coding bits which can be allocated to the P-picture and the B-picture in the GOP is smaller.

The system having the high demand with respect to the real-time feature suppresses a delay due to the coding of the moving image data, and the B-picture requiring the information on the previous and subsequent picture for the coding is not used in many cases. If the B-picture having the highest compression efficiency is not included in the GOP, the number of coding bits allocated to the P-picture is inevitably insufficient. As a result, the sharpness of the P-picture decoded from the moving image data which is coded through this CBR coding method is decreased. On the other hand, as described above, the I-picture is allocated with the sufficient number of coding bits, and thus the decoded I-picture has a high sharpness. Due to this difference in the sharpness between the P-picture and the I-picture, a subjective image quality of a viewer with respect to the decoded moving image data is decreased.

With respect to such a problem, it is reported in the following paper that if a high image quality picture and a low image quality picture are alternately arranged in the moving image data, the subjective image quality of the viewer with respect to the moving image data is satisfactory.

FUKINUKI, "Sharp/Blurred Sampled Motion Pictures and Its Application to Picture Coding"

—Extension of the Signal Processing of Motion Visual Perception—

PCSJ2007/IMPS2007, No. P 3-03 (October 2007)

However, in the GOP dealing with a scene with a motion, a picture temporally closer to the picture of interest has more similarity. Therefore, according to the inter-coding method, as a reference picture functioning as a reference for the inter-coding, by using the temporally closest picture, the coding error can be reduced. However, as described above, upon the moving image data is inter-coded so that the high quality pictures and the low quality pictures are alternately arranged from the lead-in of the GOP, the picture temporally closest to the picture of interest may have a substantially degraded image quality due to the coding. That is, it is conceivable that as the coding is carried out Based on the degraded image, the coding errors may be accumulated. The P-picture included in a second half of the GOP has the prominent image degradation due to the accumulation of the coding errors, and therefore a difference in image quality between the P-picture included in the second half of the GOP and the image quality of the I-picture immediately after the P-picture is extremely large. In the decoded moving image data, flicker noise generated per unit of GOP is conspicuous.

SUMMARY

It is an aspect of the embodiments discussed herein to provide a moving image coding apparatus and method.

The aspect can be attained by an apparatus for setting a plurality of continuous pictures having an intra-coded picture at a lead-in as a set of pictures and inter-coding or intra-coding respective pictures constituting the set of pictures.

An exemplary moving image coding apparatus includes a processing unit having an information amount control processor controlling a number of coding bits of the inter-coded picture in such a manner that when the number of coding bits is equally allocated to the inter-coded pictures, upon a position of the inter-coded picture being after a predetermined position where a coding error due to the inter-coding falls within a permissible range while a lead-in of the set of the pictures is set as a reference and also corresponds to a first position at a predetermined cycle shorter than the number of pictures included in the set of the pictures, the number of coding bits allocated to the inter-coded picture is a value obtained by adding a first predetermined amount to a predetermined reference value, and upon the position of the inter-coded picture being after the predetermined position and also is at a second position different from the first position, the number of coding bits is a value obtained by subtracting a second predetermined amount from the reference value.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

A moving image coding apparatus according to an exemplary embodiment is disclosed.

This moving image coding apparatus codes moving image data at a constant bit length in unit of GOP. The moving image coding apparatus alternately increases and decreases the number of bits allocated to the continuous P-pictures in the GOP to shorten an interval between the pictures with a small image degradation, so that the subjective image quality of the viewer is improved while the bitrate for each GOP at constant.

According to an embodiment, the GOP includes only the I-picture and the P-picture, and the B-picture is not used. The picture included in the moving image data which is the coding target is a top field or a bottom field obtained Based on an interlaced system. However, the picture included in the moving image data which is the coding target may be a frame obtained Based on a progressive system.

Figure 1:
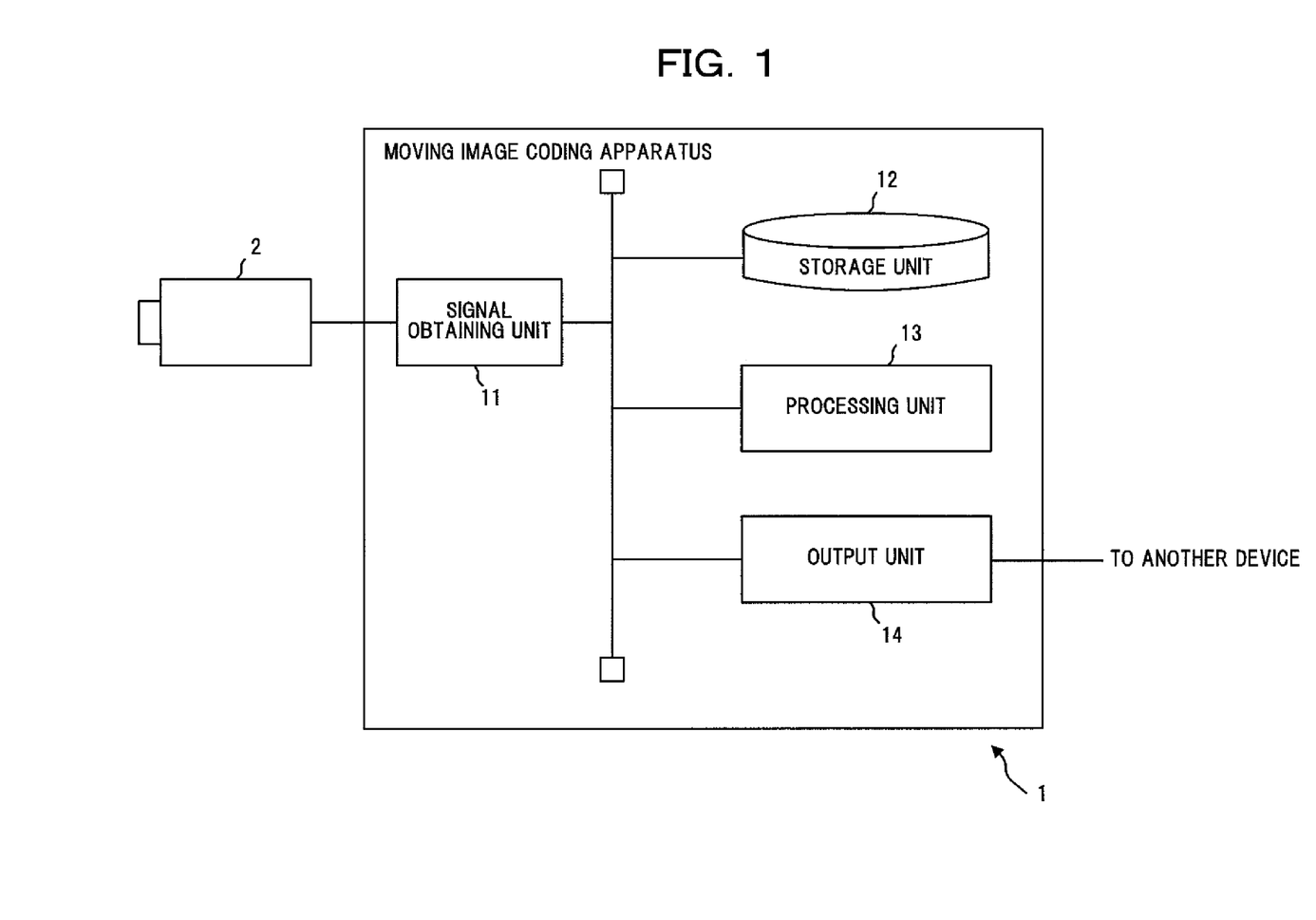
FIG. 1 illustrates a moving image coding apparatus according to an exemplary embodiment.

FIG. 1 illustrates a moving image coding apparatus 1 according to an exemplary embodiment. As shown in FIG. 1, the moving image coding apparatus 1 includes a signal obtaining unit 11, a storage unit 12, a processing unit 13, and an output unit 14.

The signal obtaining unit 11 obtains the moving image data which is the coding target. The signal obtaining unit 11 includes, for example, a video camera 2 for generating the moving image data and a video input interface for a connection of the moving image coding apparatus 1. Alternatively, the signal obtaining unit 11 includes a communication interface for connecting the moving image coding apparatus 1 to the communication network for obtaining the moving image data from another apparatus via a communication network (not shown) and a control circuit for the communication interface. For example, the signal obtaining unit 11 includes a communication interface for a connection to the communication network following a communication standard such as Ethernet (registered trademark) or Integrated Services Digital Network (ISDN) and a control circuit for the communication interface. Alternatively, the signal obtaining unit 11 may include a communication interface following a standard for a short distance communication such as Universal Serial Bus 2 (USB2) and a control circuit for the communication interface.

The signal obtaining unit 11 is connected to the storage unit 12 and the processing unit 13. The moving image data obtained by the signal obtaining unit 11 is passed to the processing unit 13.

The output unit 14 outputs data stream including the coded moving image data generated by the processing unit 13 to another device. The output unit 14 includes, for example, a transmitter for transforming the data stream in a predetermined signal format to be wirelessly transmitted and an antenna connected to the transmitter. Alternatively, the output unit 14 may includes a communication interface for connecting the moving image coding apparatus 1 to the communication network (not shown) and a control circuit for the communication interface. Also, in this case, the signal obtaining unit 11 and the output unit 14 may be integrally formed.

The storage unit 12 includes, for example, at least one of a semiconductor memory, a magnetic disk apparatus, and an optical disk apparatus. The storage unit 12 may store a computer program and various pieces of data used in the moving image coding apparatus 1. The storage unit 12 may store the moving image data received via the signal obtaining unit 11 or the moving image data coded by the processing unit 13.

The processing unit 13 includes one or plural pieces of processors, a memory, and a peripheral circuitry thereof. The processing unit 13 codes the moving image data obtained via the signal obtaining unit 11 to reduce the data amount of the moving image data.

Figure 2:
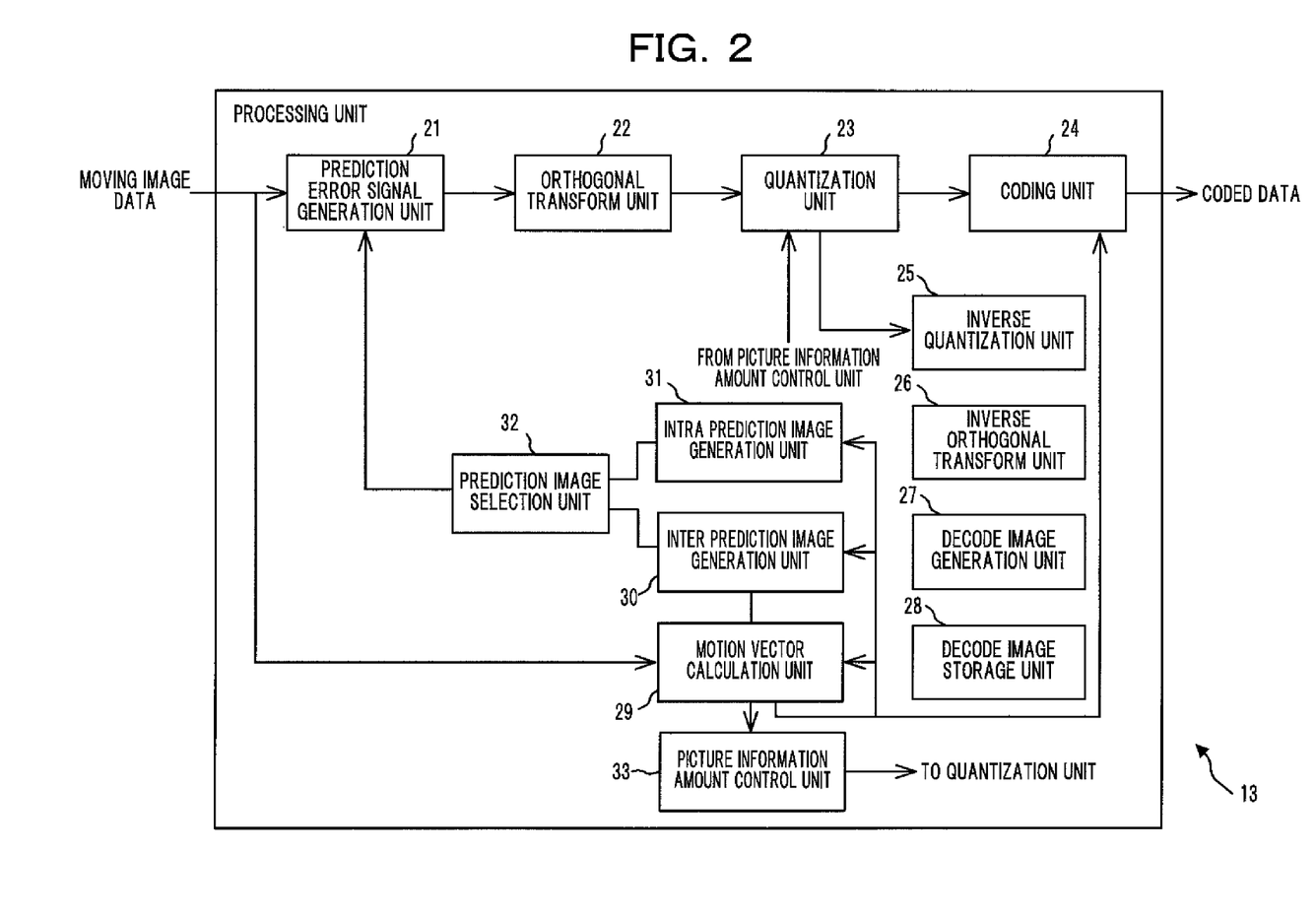
FIG. 2 illustrates a processing unit of the moving image coding apparatus.

FIG. 2 illustrates the processing unit 13 showing a function realized for coding the moving image data. As shown in FIG. 2, the processing unit 13 includes a prediction error signal generation unit 21, an orthogonal transform unit 22, a quantization unit 23, a coding unit 24, an inverse quantization unit 25, an inverse orthogonal transform unit 26, a decode image generation unit 27, a decode image storage unit 28, a motion vector calculation unit 29, an inter-prediction image generation unit 30, an intra-prediction image generation unit 31, a prediction image selection unit 32, and a picture information amount control unit 33. The respective units except for the decode image storage unit 28 provided to the processing unit 13 are a function module mounted by a computer program executed on a processing provided to the processing unit 13. The decode image storage unit 28 can be a memory provided to the processing unit 13. Alternatively, these respective units provided to the processing unit 13 may be mounted to the moving image coding apparatus 1 as respectively individual computation circuits or one integrated circuit in which these computation circuits are integrated.

The prediction error signal generation unit 21 divides the current picture which is the coding target among the input moving image data into blocks composed of a predetermined number of pixels. This block is referred to as macro block. The macro block includes, for example, 16×16 pixels.

The prediction error signal generation unit 21 executes a difference computation between the respective macro blocks and the prediction image supplied from the prediction image selection unit 32. The prediction error signal generation unit 21 generates a difference value corresponding to the respective pixels in the macro blocks obtained from the difference computation as a prediction error signal.

The prediction error signal generation unit 21 passes the generated prediction error signal to the orthogonal transform unit 22.

The orthogonal transform unit 22 subjects the prediction error signal of the respective macro blocks obtained from the prediction error signal generation unit 21 to an orthogonal transform processing to obtain a frequency signal representing a frequency component in the horizontal direction and a frequency component in the vertical direction of the prediction error signal. For example, the orthogonal transform unit 22 executes Discrete Cosine Transform (DCT) as the orthogonal transform processing on the prediction error signal to obtain a set of coefficients for each macro block as the frequency signal.

The orthogonal transform unit 22 supplies the frequency signal obtained through the orthogonal transform processing to the quantization unit 23.

The quantization unit 23 quantizes the frequency signal received from the orthogonal transform unit 22 while following a quantization parameter decided by the picture information amount control unit 33. This quantization processing is a processing in which a signal value included in a constant interval is represented by one signal value. The constant interval is referred to as quantization width. For example, the quantization unit 23 cuts off a predetermined number of lower bits equivalent to the quantization width from the frequency signal received from the orthogonal transform unit 22 to quantize the frequency signal. The quantization width is decided by the quantization parameter. For example, the quantization unit 23 decides the quantization width to be used while following a function representing the value of the quantization width with respect to the value of the quantization parameter. The function can be monotone increasing with respect to the value of the quantization parameter and is previously set. Alternatively, a plurality of quantization matrices regulating the quantization width respectively corresponding to the frequency component in the horizontal direction and the frequency component in the vertical direction are previously prepared and stored in the storage unit 12. The quantization unit 23 may select a particular quantization matrix among these quantization matrices stored in the storage unit 12 while following the quantization parameter. The quantization unit 23 refers to the selected quantization matrix to decide the quantization width with respect to the respective frequency components of the frequency signal. The quantization unit 23 may select a quantization matrix whose quantization width with respect to the respective frequency components is larger as the value of the quantization parameter is larger.

By executing the quantization processing, the number of bits used for representing the respective frequency components of the frequency signal can be reduced, so that the quantization unit 23 can reduce the information amount included in the respective macro blocks. The quantization unit 23 supplies the quantized signal to the coding unit 24 and the inverse quantization unit 25.

The coding unit 24 codes the quantized signal received from the quantization unit 23 and the motion vector received from the motion vector calculation unit 29 to generate the coded signal in which the data amount is compressed. The coding unit 24 executes, for example, a variable-length coding processing for allocating a variable-length code word which becomes shorter for the signal value whose occurrence probability is higher with respect to the quantization signal. It should be noted that the variable-length coding processing is also referred to as entropy coding processing. For example, the coding unit 24 can carry out a Huffman coding processing or an arithmetic coding processing as the variable-length coding processing.

By adding predetermined information to the coding signal generated by the coding unit 24 as header information, the processing unit 13 generates a data stream including the coded moving image data. The processing unit 13 may store the data stream in the storage unit 12 or outputs the data stream to another device via the output unit 14.

The inverse quantization unit 25 subjects the quantization signal received from the quantization unit 23 to inverse quantization by multiplying a predetermined number equivalent to the quantization width decided by the quantization parameter. Through this inverse quantization, the frequency signal of the respective macro blocks, for example, a set of DCT coefficients is restored. The inverse quantization unit 25 supplies the obtained frequency signal to the inverse orthogonal transform unit 26.

The inverse orthogonal transform unit 26 subjects the frequency signal received from the inverse quantization unit 25 to the inverse orthogonal transform processing. For example, upon the DCT processing is carried out in the orthogonal transform unit 22, the inverse orthogonal transform unit 26 subjects the signal received from the inverse quantization unit 25 to inverse DCT. By the inverse quantization unit 25 and the inverse orthogonal transform unit 26, the prediction error signal having information comparable to the prediction error signal before the coding is reproduced. The inverse orthogonal transform unit 26 supplies the reproduced prediction error signal to the decode image generation unit 27.

With regard to the P-picture to be inter-coded, the decode image generation unit 27 adds the respective pixel values of the predicted image which has been subjected to the motion compensation by the inter-prediction image generation unit 30 with the prediction error signal reproduced by the inverse quantization unit 25 and the inverse orthogonal transform unit 26 corresponding to the relevant pixel. On the other hand, with regard to the I-picture to be intra-coded, the decode image generation unit 27 adds the respective pixel value of the prediction image generated by the intra-prediction image generation unit 31 with the prediction error signal reproduced by the inverse quantization unit 25 and the inverse orthogonal transform unit 26 corresponding to the relevant pixel. As these processings are executed on the respective macro blocks, the decode image generation unit 27 obtains the decode image as a prediction picture with respect to the next coding target picture.

The decode image generation unit 27 passes the obtained prediction picture to the decode image storage unit 28.

The decode image storage unit 28 temporarily may store the prediction picture passed from the decode image generation unit 27 as a new reference picture. The decode image storage unit 28 supplies the reference picture to the intra-prediction image generation unit 31, the inter-prediction image generation unit 30, and the motion vector calculation unit 29. It should be noted that the decode image storage unit 28 may store a previously set predetermined number of reference pictures, and when the number of stored reference pictures exceeds the predetermined number, the reference picture is discarded in an order from the older reference pictures.

The motion vector calculation unit 29 uses the respective macro blocks of the current picture of the input moving image data and the already coded reference picture obtained from the decode image storage unit 28 to obtain the motion vector. The motion vector represents a spatial moving amount between the macro block of the current picture and the block of the reference picture most similar to the macro block in unit of block. The motion vector calculation unit 29 executes block matching, for example, between the macro block of interest of the current picture and the respective reference pictures to obtain a cost C with respect to the macro block with regard to the respective positions of the respective reference pictures. The cost C can be obtained, for example, from the following expression.

$$C = \sum_{i=1}^{M} |CP_i - PP_i| \quad (1)$$

CPi denotes a pixel value of the pixels included in the macro block.

PPi denotes a pixel value of a corresponding pixel of the reference picture subjected to the block matching.

M denotes the total number of pixels included in the macro blocks.

The motion vector calculation unit 29 decides the block of the reference picture whose cost C is smallest. The motion vector calculation unit 29 sets a difference between the position of the macro block of interest in the horizontal direction and the obtained position of the block of the reference picture in the horizontal direction as a moving amount MVx in the horizontal direction. Similarly, the motion vector calculation unit 29 sets a difference between the position of the macro block of interest in the vertical direction and the obtained position of the block of the reference picture in the vertical direction as a moving amount MVy in the vertical direction. The motion vector calculation unit 29 sets as the motion vector a vector which uses the moving amount MVx in the horizontal direction, the moving amount MVy in the vertical direction, and the identification information representing the selected reference picture as elements.

It should be noted that as will be described below, in the second half of the GOP, the number of coding bits allocated to the top field is larger than the number of coding bits allocated to the bottom field. The motion vector calculation unit 29 preferably also limits the reference picture which is referred to for obtaining the motion vector to only the top field. According to this, it is possible to obtain the motion vector Based on the reference picture with the small image quality degradation, and the moving image coding apparatus 1 can reduce the coding error propagating in the GOP.

With respect to the respective macro blocks included in the current picture, the motion vector calculation unit 29 respectively obtains the motion vectors. The motion vector calculation unit 29 passes the obtained motion vectors to the inter-prediction image generation unit 30 and the picture information amount control unit 33.

The inter-prediction image generation unit 30 performs a motion compensation on the reference picture obtained from the decode image storage unit 28 Based on the motion vector provided from the motion vector calculation unit 29 to generate the prediction image subjected to the motion compensation in unit of block. It should be noted that the motion compensation is a processing of moving the position of the most similar block of the reference picture so that the positional deviation amount represented by the motion vector between the macro block and the block of the reference picture most similar to the macro block is cancelled out.

With regard to the macro block of interest among the current picture of the moving image data, the intra-prediction image generation unit 31 generates the prediction image from the already coded pixel value included in the macro block adjacent on the left side or the upper side of the macro block of interest through the interpolation.

The prediction image selection unit 32 may select one of the prediction image output from the intra-prediction image generation unit 31 and the prediction image output from the inter-prediction image generation unit 30. The prediction image selection unit 32 may select the prediction image generated by the intra-prediction image generation unit 31 if the current picture is the I-picture, and on the other hand may select the prediction image generated by the inter-prediction image generation unit 30 if the current picture is the P-picture. It should be noted that if the current picture is the lead-in picture of the GOP, the prediction image selection unit 32 can determine that the current picture is the I-picture. The prediction image selection unit 32 supplies the selected prediction image to the prediction error signal generation unit 21.

The picture information amount control unit 33 decides the quantization parameter for controlling the number of coding bits allocated to the picture to be coded by the quantization unit 23.

Figure 3:
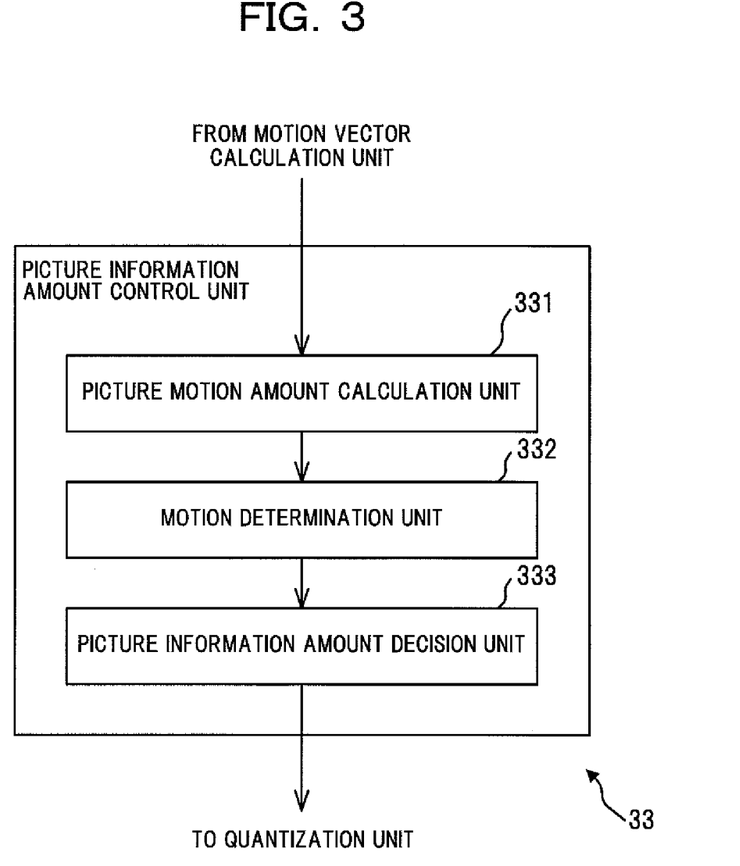
FIG. 3 illustrates a picture information amount control unit.

FIG. 3 illustrates functions provided to the picture information amount control unit 33. As shown in FIG. 3, the picture information amount control unit 33 includes a picture motion amount calculation unit 331, a motion determination unit 332, and the picture information amount decision unit 333.

Upon the current picture is the P-picture, the picture motion amount calculation unit 331 calculates a statistics amount related to the absolute value of the moving amount of the respective macro blocks as a picture motion amount which is an index for determining whether the current picture corresponds to the scene with the motion. The picture motion amount calculation unit 331 accumulatively adds the absolute value of the moving amount MVx in the horizontal direction of the motion vector corresponding to the respective macro blocks of the current picture received from the motion vector calculation unit 29 to calculate an accumulative horizontal moving amount SMVx (=Σ|MVx|). The picture motion amount calculation unit 331 accumulatively adds the absolute value of the moving amount MVy in the vertical direction of the motion vector corresponding to the respective macro blocks of the current picture to calculate an accumulative vertical moving amount SMVy (=Σ|MVy|). It should be noted that the picture motion amount calculation unit 331 may calculate SMVx and SMVy by accumulatively adding the absolute value obtained by dividing the moving amount MVx in the horizontal direction and the moving amount MVy in the vertical direction of the respective macro blocks by a time difference between the corresponding reference picture and the current picture. The time difference between the corresponding reference picture and the current picture is represented by the number of pictures corresponding to the difference between the position in the GOP of the reference picture and the position in the GOP of the current picture.

The picture motion amount calculation unit 331 obtains a horizontal average moving amount AvMVx (=SMx/MBN) and a vertical average moving amount AvMVy (=SMy/MBN) by respectively dividing the accumulative horizontal moving amount SMVx and the accumulative vertical moving amount SMVy by the total number of macro blocks MBN included in the current picture. Finally, the picture motion amount calculation unit 331 calculates a picture motion amount PMV while following the expression below.

$$PMV = \alpha \times AvMVx + \beta \times AvMVy \quad (2)$$

$\alpha$ and $\beta$ are respectively coefficients.

Upon the moving image coding apparatus 1 attempts to detect the motion in the vertical direction, for example, $\alpha$ is set as 0, and $\beta$ is set as 1. On the other hand, upon the moving image coding apparatus 1 attempts to detect the motion in the horizontal direction, for example, $\alpha$ is set as 1, and $\beta$ is set as 0.

To obtain the picture motion amount PMV, the picture motion amount calculation unit 331 may respectively obtain a mode value MMVx of the absolute value of the moving amount MVx in the horizontal direction and a mode value MMVy of the absolute value of the moving amount MVy in the vertical direction of the motion vector corresponding to the respective macro blocks of the current picture. The picture motion amount calculation unit 331 may calculate the picture motion amount PMV by replacing AvMVx and AvMVy in the expression (2) described above with the mode values MMVx and MMVy thereof. Furthermore, in order to obtain the picture motion amount PMV, the picture motion amount calculation unit 331 may respectively obtain a median value CMVy of the absolute value of the moving amount MVx in the horizontal direction and a median value CMVy of the absolute value of the moving amount MVy in the vertical direction of the motion vector corresponding to the respective macro blocks of the current picture. The picture motion amount calculation unit 331 may calculate the picture motion amount PMV by replacing AvMVx and AvMVy in the expression (2) described above with the median values CMVx and CMVy thereof.

The picture motion amount calculation unit 331 passes the calculated picture motion amount PMV to the motion determination unit 332.

The motion determination unit 332 compares the picture motion amount PMV received from the picture motion amount calculation unit 331 with a predetermined threshold Thmv. Then, upon the picture motion amount PMV is larger than the threshold Thmv, the motion determination unit 332 determines that the current picture is the picture corresponding to the scene with the motion. On the other hand, upon the picture motion amount PMV is equal to or smaller than the threshold Thmv, the motion determination unit 332 determines that the current picture is the picture corresponding to the stationary scene. It should be noted that the threshold Thmv is set in accordance with the size of the motion desired to be detected. For example, in the expression (2) described above, upon any one of $\alpha$ and $\beta$ is 1, and the other one is 0, the threshold Thmv is set as 1.

The motion determination unit 332 notifies the picture information amount decision unit 333 of motion determination information on the determination result on whether the current picture is the picture corresponding to the scene with the motion.

Based on the motion determination information notified from the motion determination unit 332 and the position in the GOP of the current picture, the picture information amount decision unit 333 decides the value of the quantization parameter with respect to the current picture. At this time, if the motion determination information indicates that the current picture is the picture corresponding to the stationary scene, the picture information amount decision unit 333 decides the quantization parameter value so that the same number of coding bits are allocated to all the P-pictures included in the GOP. If the motion determination information indicates that the current picture is the picture corresponding to the scene with the motion, the picture information amount decision unit 333 decides the quantization parameter value so that the number of coding bits is adjusted in accordance with the position in the GOP of the current picture or the image quality degradation degree. The picture information amount decision unit 333 decides the quantization parameter so that the number of coding bits to be allocated is large upon the current picture is the top field and the number of coding bits to be allocated is small upon the current picture is the bottom field.

The picture information amount decision unit 333 obtains basic target information amounts Ti and Tp of the I-picture and the P-picture while following, for example, a method adopted in Standard Test Model 5 of MPEG-2. Furthermore, the picture information amount decision unit 333 obtains the correction information amount $\Delta T$ with respect to the P-picture. The picture information amount decision unit 333 calculates a target information amount T Based on the basic target information amounts Ti and Tp and the correction information amount $\Delta T$. The picture information amount decision unit 333 obtains quantization parameters Qi and Qp in accordance with the value of the target information amount T. It should be noted that with regard to the calculation method for the quantization parameters Qi and Qp related to Standard Test Model 5 of MPEG-2, refer to a URL identified by http://www.mpeg.org/MPEG/MSSG/tm5/Ch10/Ch10.html.

It should be noted that the picture information amount decision unit 333 may adopt another decision method for the quantization parameter as long as the decision method sets that as the value of the target information amount T is larger, the values of the quantization parameters Qi and Qp are smaller. For example, the picture information amount decision unit 333 may decide the quantization parameter by using a rate-distortion function representing a relation between the target information amount and the quantization parameter.

The picture information amount decision unit 333 calculates a complexity level estimated with respect to the current picture.

The complexity level of the respective pictures is calculated from the following expression.

$$X_i = S_i Q_i$$

$$X_p = S_p Q_p \quad (3)$$

Xi denotes a complexity level with respect to the I-picture.
Xp denotes a complexity level with respect to the P-picture.
Si and Sp denote the numbers of bits generated through the coding with respect to the already coded immediately preceding pictures, respectively.

Qi and Qp denote average quantization parameters calculated by averaging out the quantization parameters of all macro blocks used for coding the previous pictures, respectively.

It should be noted that, for example, initial values of Xi and Xp are set as follows.

$$Xi = (160 * bitrate)/115$$

$$Xp = (60 * bitrate)/115 \text{ where bitrate denotes an information amount per second given for the coding (bit/s).}$$

The picture information amount decision unit 333 calculates the basic target information amounts Ti and Tp through the following expression Based on the calculated complexity levels Xi and Xp.

$$T_i = \max\left\{ \frac{R}{\left(1 + \frac{N_p X_p}{X_i K_p} + \frac{N_b X_b}{X_i K_b}\right)}, \frac{bitrate}{8 \times picturerate} \right\} \quad (4)$$

$$T_p = \max\left\{ \frac{R}{\left(N_p + \frac{N_b K_p X_b}{K_b X_p}\right)}, \frac{bitrate}{8 \times picturerate} \right\}$$

Kp and Kb are constant numbers, where Kp=1.0 and Kb=1.4 are set in general.

R denotes a remaining number of bits that can be allocated to the GOP.

R is updated in the following manner after the coding of the respective pictures is completed.

$$R = R - Si \text{ or } R = R - Sp$$

It should be noted that Si and Sp respectively denote the number of bit numbers generated through the coding with regard to the already coded immediately preceding picture. Also, when the first picture of the GOP, that is, the I-picture is coded, the remaining number of bits R is updated in the following manner by using the remaining number of bits Rp calculated with regard to the previous GOP.

$$R = G + RpG = bitrate * N/picturerate$$

Where N denotes the number of pictures included in the GOP. It should be noted that with respect to the first GOP of the moving image data, R is set as 0. Furthermore, in the moving image data of the coding target, picturerate denotes the number of frames scanned per second (Hz).

In addition, in the expression (4), Np and Nb respectively denote the remaining numbers of P-pictures and B-pictures that are not coded in the GOP in the coding order. According to the present embodiment, as the GOP does not include the B-picture, Nb=0 is established. Also, a function max(a,b) is a processor outputting a larger value of variants a and b.

Furthermore, the picture information amount decision unit 333 uses the correction information amount $\Delta T$ to adjust the target information amount so that the numbers of coding bits allocated to the P-pictures located after a predetermined position in the GOP are alternately increased and decreased. The predetermined position is preferably set as a position on a most backward side among positions where it is supposed that the coding error generated by the inter-coding affecting the degradation of the subjective image quality for the user falls within a permissible range upon the number of coding bits are equally allocated to the respective pictures. According to this, as the reference picture temporally closest to the current picture has at least a certain image quality or higher, in the first half of the GOP where the number of coding bits are equally allocated, the picture information amount decision unit 333 can suppress the coding error generated by the inter-coding to minimum. On the other hand, the picture information amount decision unit 333 can create the P-picture where the coding error is no longer increased every other picture in the second half of the GOP where the coding error is increased to some extent or more.

The picture information amount decision unit 333 compares the number Np of P-pictures which are not coded in the GOP with the threshold ThN to determine whether the current picture is included in the second half of the GOP. It should be noted that the threshold ThN is set as a value corresponding to the above-mentioned predetermined position, for example, N/2. Then, upon the number Np of P-pictures which are not coded is smaller than the threshold ThN, that is, upon the current picture is included in the second half of the GOP, the picture information amount decision unit 333 calculates the correction information amount $\Delta T$. Then, upon the current picture is the top field, the picture information amount decision unit 333 sets a value obtained by adding the basic target information amount Tp calculated through the expression (4) with the correction information amount $\Delta T$ as the target information amount T with respect to the current picture. On the other hand, upon the current picture is the bottom field, the picture information amount decision unit 333 sets a value obtained by subtracting the correction information amount $\Delta T$ from the basic target information amount Tp calculated through the expression (4) as the target information amount T with respect to the current picture.

It should be however noted that the correction information amount $\Delta T$ is calculated, for example, from the following expression.

$$\Delta T = kT_p\left(1 - \frac{N_p}{ThN}\right) \quad (5)$$

Where k denotes a coefficient.

A value of k may be set, for example, so that among the P-pictures in the GOP, the image quality of the P-picture of the top field becomes constant. Furthermore, for example, upon the B-picture is included in the GOP, the value of k may be set so that the number of coding bits with respect to the P-picture of the bottom field is equal to or larger than the number of coding bits allocated to the relevant B-picture. It should be noted that the image quality of the decoded picture is evaluated, for example, by calculating Peak Signal To Noise Rate (PSNR) from the reference picture stored in the decode image storage unit 28 and the original picture corresponding to the reference picture.

Also, in order to set the number of coding bits allocated to the bottom field equal to or larger than the number of coding bits allocated to the B-picture, the target information amount T may be equal to or larger than the basic target information amount Tb with respect to the B-picture. Herein, the basic target information amount Tb with respect to the B-picture is obtained from the following expression.

$$T_b = \max\left\{ \frac{R}{\left(N_b + \frac{N_p K_b X_p}{K_p X_b}\right)}, \frac{\text{bitrate}}{8 \times \text{picturerate}} \right\} \quad (6)$$

Where, in this case, Np and Nb are decided while it is supposed that in the GOP, after the I-picture, two B-pictures and one P-picture are repeatedly arranged. Also, similar to Xi and Xp, Xb is obtained through a product of Sb and Qb. Sb denotes the number of bits generated through the coding with regard to the already coded immediately preceding picture, and Qb denotes the average quantization parameter calculated by averaging out the quantization parameters of all the macro blocks used for coding the previous picture.

Also as is clear from the (5) expression, the correction information amount ΔT becomes a larger value as Np is smaller. That is, as the present picture is closer to the ending of the GOP, the correction information amount ΔT becomes a larger value. Therefore, the picture information amount decision unit 333 can allocate the larger number of coding bits to the top field closer to the ending of the GOP.

Next, the picture information amount decision unit 333 decides the quantization parameter Based on the target information amount T. The picture information amount decision unit 333 calculates sufficiency levels dij and dpj of appropriate virtual buffers before the j-th macro block is coded. The sufficiency levels dij and dpj are calculated Based on the following expression.

$$d_{ij} = d_{i0} + B_{j-1} - \left(\frac{T_i \times (j-1)}{MBN}\right) \quad (7)$$

$$d_{pj} = d_{p0} + B_{j-1} - \left(\frac{T_p \times (j-1)}{MBN}\right)$$

At this time, Bj−1 denotes the number of bits generated when all the macro blocks from the first to the (j−1)-th macro block are coded. MBN denotes the number of macro blocks included in the picture. In addition, di0 and dp0 denote initial values of the sufficiency levels. It should be noted that with respect to a particular picture, the sufficiency levels diMBN and dpMBN when the macro blocks up to the last macro block are coded are the initial values di0 and dp0 of the sufficiency levels with respect to the next picture of the same type.

Finally, the picture information amount decision unit 333 uses the sufficiency levels dij and dpj to decide the quantization parameter with respect to the j-th macro block Based on the following expression.

$$Q_j = \left(\frac{d_j \times 31}{r}\right) \quad (8)$$

$$r = 2 \times \frac{\text{bitrate}}{\text{pictuerate}}$$

Where dj is dij if the current picture is the I-picture, and dj is dpj if the current picture is the P-picture.

The picture information amount decision unit 333 passes the obtained quantization parameter to the quantization unit 23.

Figure 4A:
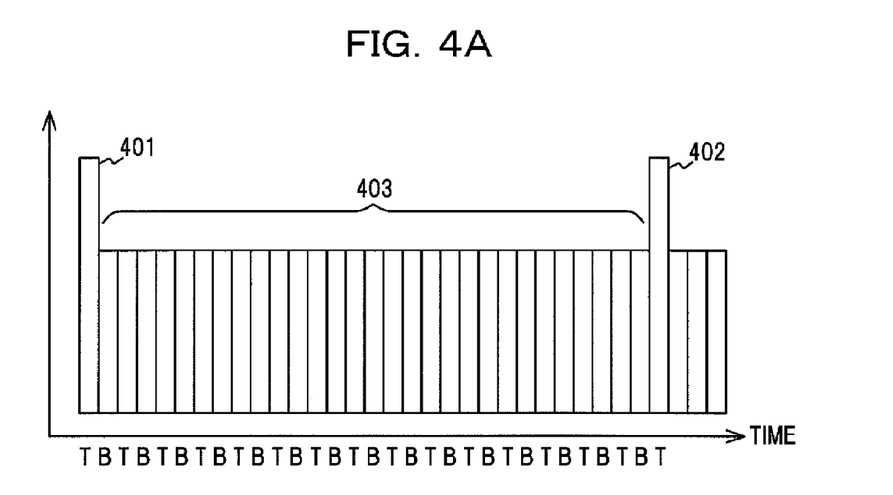
FIG. 4A illustrates a number of coding bits allocated to the respective pictures in a GOP Based on a quantization parameter decided by the picture information amount control unit upon a scene dealing with the GOP is a stationary scene.

FIG. 4A is a graphic representation showing the number of coding bits allocated to the respective pictures in the GOP Based on the quantization parameter decided by the picture information amount decision unit 333 upon the scene corresponding to the GOP is a stationary scene. Also, FIG. 4B is a graphic representation showing the number of coding bits allocated to the respective pictures in the GOP Based on the quantization parameter decided by the picture information amount decision unit 333 upon the scene corresponding to the GOP is a scene with a motion.

Figure 4B:
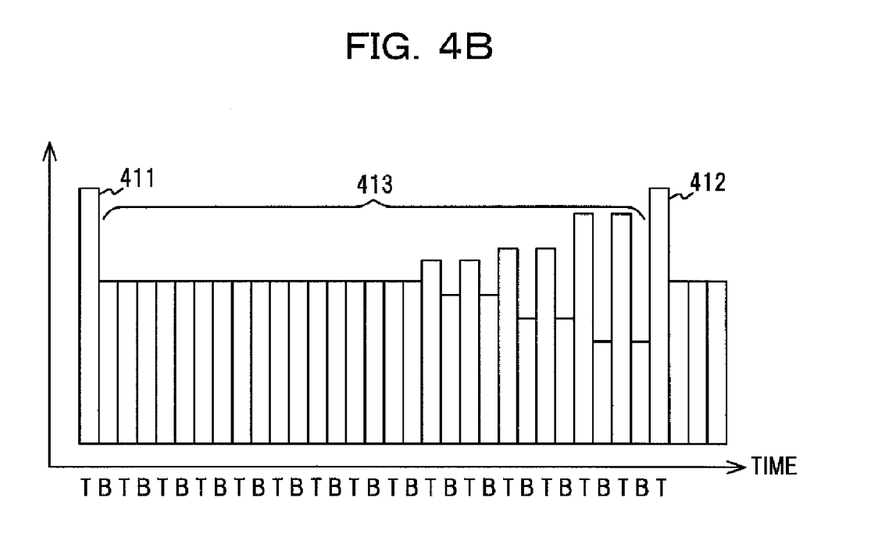
FIG. 4B illustrates a number of coding bits allocated to the respective pictures in the GOP Based on the quantization parameter decided by the picture information amount control unit upon a scene dealing with the GOP is a scene having a motion.

In FIGS. 4A and 4B, the horizontal axis represents the time, and the vertical axis represents the information amount, that is, the number of coding bits allocated to the picture. Also, in FIG. 4A, bar graphs 401 and 402 represent the number of coding bits allocated to the I-picture located at the lead-in of the GOP. In addition, other respective bar graphs 403 represent the number of coding bits allocated to one each of the P-pictures. Similarly, in FIG. 4B, bar graphs 411 and 412 represent the number of coding bits allocated to the I-picture located at the lead-in of the GOP. In addition, other respective bar graphs 413 represent the number of coding bits allocated to one each of the P-pictures. Furthermore, "T" and "B" indicated below the respective bar graphs represent that the picture corresponding to the relevant bar graph is the top field or the bottom field, respectively.

As is understood from FIG. 4A, upon the GOP corresponds to the stationary scene, the number of coding bits allocated to the I-picture is larger than the numbers of coding bits allocated to any of the P-pictures, and meanwhile, the numbers of coding bits allocated to the respective P-pictures are constant. In the stationary scene, as the error between the continuous P-pictures is small, the information amount necessary for coding the respective P-pictures may be small. For that reason, by equally allocating the coding bit numbers to the respective P-pictures, the moving image coding apparatus 1 can suppress the image quality degradation of all the P-picture.

On the other hand, as is understood from FIG. 4B, upon the GOP corresponds to the scene with the motion, in the second half in the GOP, the numbers of coding bits allocated to the P-pictures are alternately increased and decreased. Then, in particular, as the present picture is closer to the ending of the GOP, the numbers of coding bits allocated to the P-picture of the top field is increased. In contrast, as the present picture is closer to the ending of the GOP, the numbers of coding bits allocated to the P-picture of the bottom field is decreased. In the P-picture which is the same field as the I-picture, as a still larger information amount is allocated, the degradation in the image quality of the P-picture of the top field is suppressed. For that reason, as a difference between the image quality of the P-picture of the top field and the image quality of the I-picture located at the lead-in of the next GOP is small, the moving image coding apparatus 1 can suppress the generation of flicker. It should be noted that the image quality of the P-picture of the bottom field is degraded, but as described above, if the picture having the satisfactory image quality and the picture having the unsatisfactory image quality are alternately arranged, the subjective image quality of the viewer is not degraded.

Figure 5:
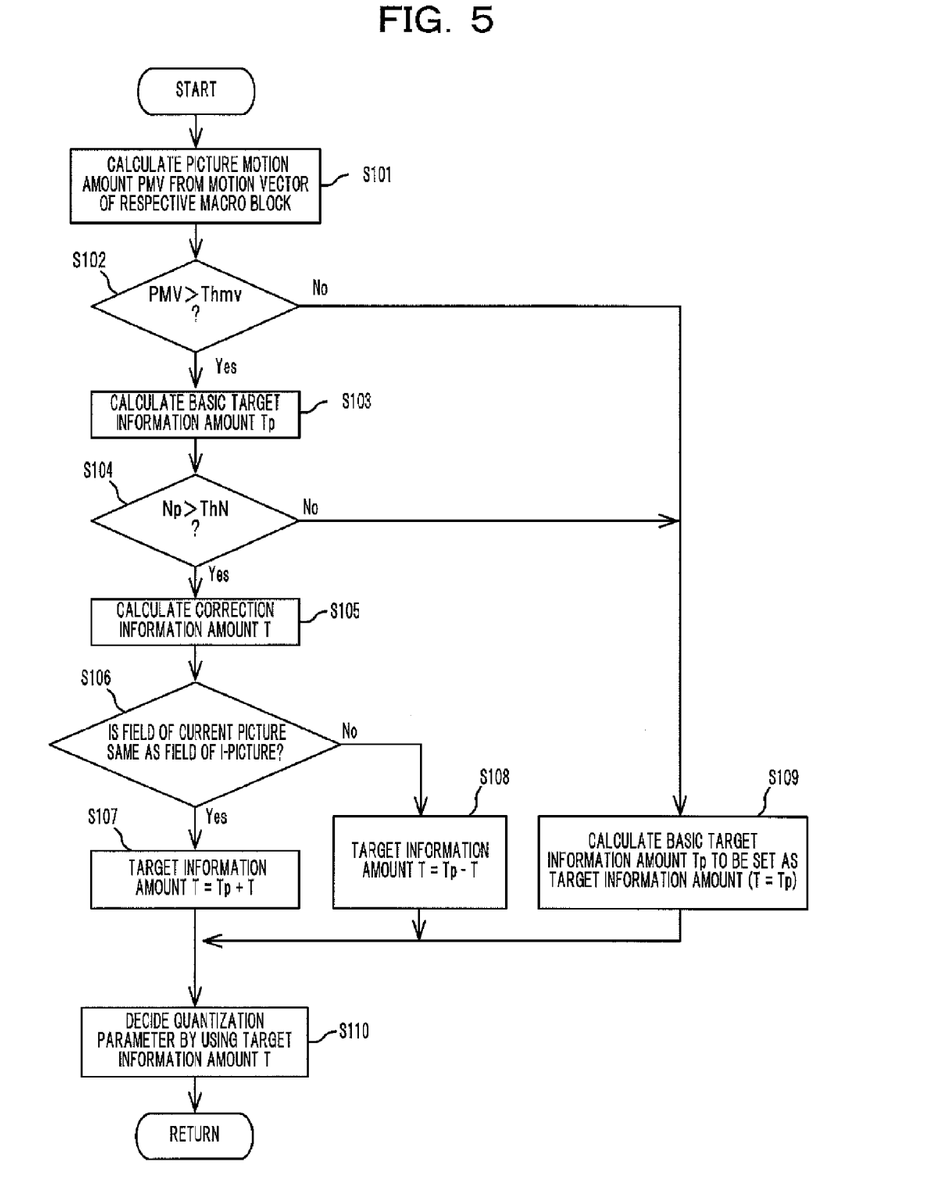
FIG. 5 illustrates a quantization parameter decision processing on a P-picture by the picture information amount control unit controlled by a computer program executed on the processing unit of the moving image coding apparatus according to an exemplary embodiment.

FIG. 5 illustrates a quantization parameter decision processing on the P-picture by the picture information amount control unit 33 of the processing unit 13 which is controlled by a computer program executed on the processing unit 13.

First, the picture motion amount calculation unit 331 of the picture information amount control unit 33 calculates the picture motion amount PMV from the motion vector of the respective macro blocks received from the motion vector calculation unit 29 (operation S101). The picture motion amount calculation unit 331 passes the picture motion amount PMV to the motion determination unit 332 of the picture information amount control unit 33.

Next, the motion determination unit 332 determines whether the picture motion amount PMV received from the picture motion amount calculation unit 331 is larger than the predetermined threshold Thmv (operation S102). Upon the picture motion amount PMV is equal to or smaller than the predetermined threshold Thmv (operation S102—No), the motion determination unit 332 determines that the current picture is the picture corresponding to the stationary scene. The motion determination unit 332 notifies the picture information amount decision unit 333 of the picture information amount control unit 33 of the motion determination information indicating the determination result that the current picture is the picture corresponding to the stationary scene.

While following the expressions (3) and (4) described above, the picture information amount decision unit 333 calculates the basic target information amount Tp with respect to the P-picture. The picture information amount decision unit 333 sets the calculated basic target information amount Tp as the target information amount T (operation S109). The processing unit 13 shifts the control to operation S110.

On the other hand, in operation S102, upon the picture motion amount PMV is larger than the predetermined threshold Thmv (operation S102—Yes), the motion determination unit 332 determines that the current picture is the picture corresponding to the scene with the motion. The motion determination unit 332 notifies the picture information amount decision unit 333 of the motion determination information indicating the determination result that the current picture is the picture corresponding to the scene with the motion.

While following the expressions (3) and (4) described above, the picture information amount decision unit 333 calculates the basic target information amount Tp with respect to the P-picture (operation S103). Next, the picture information amount decision unit 333 determines whether the number Np of the P-pictures which are not coded in the GOP is smaller than the threshold ThN (operation S104). Upon the number Np of the P-pictures is equal to or larger than the threshold ThN (operation S104—No), the processing unit 13 shifts the control to operation S109. On the other hand, upon the number Np of the P-pictures is smaller than the threshold ThN (operation S104—Yes), the picture information amount decision unit 333 calculates the correction information amount ΔT while following the above-mentioned expression (5) (operation S105).

The picture information amount decision unit 333 determines whether the field of the current picture is the same as the field of the I-picture (operation S106). If the field of the current picture is the same as the field of the I-picture (operation S106—Yes), the picture information amount decision unit 333 sets a value obtained by adding the basic target information amount Tp with the correction information amount ΔT as the target information amount T (operation S107). It should be noted that as the I-picture is located at the lead-in of the GOP, upon the current picture is the top field, the field of the current picture is the same as the field of the I-picture.

On the other hand, if the field of the current picture is different from the field of the I-picture (operation S106—No), the picture information amount decision unit 333 sets a value obtained by subtracting the correction information amount ΔT from the basic target information amount Tp as the target information amount T (operation S108).

When the target information amount T is decided in any one of operations S107 to S109, the picture information amount decision unit 333 uses the target information amount T to decide the quantization parameter while following the expressions (7) and (8) (operation S110). The picture information amount decision unit 333 passes the obtained quantization parameter to the quantization unit 23.

The picture information amount control unit 33 ends the decision processing for the quantization parameter with respect to the P-picture.

It should be noted that as to the quantization parameter with respect to the I-picture, while following the expressions (3) and (4) described above, the picture information amount control unit 33 calculates the basic target information amount Ti. Then, while following the expressions (7) and (8), the picture information amount control unit 33 may decide the quantization parameter by using the basic target information amount Ti.

Figure 6:
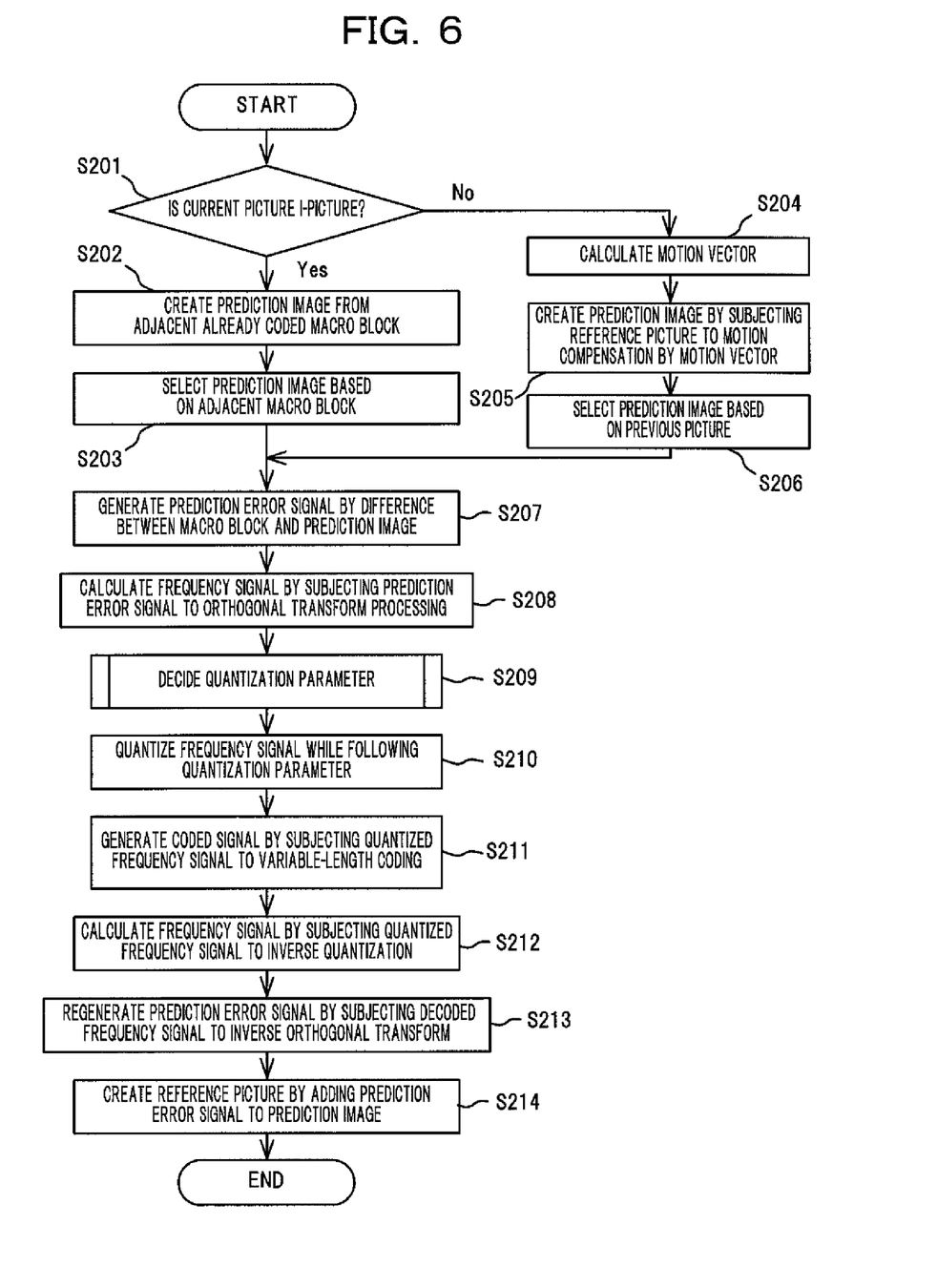
FIG. 6 illustrates a coding processing on moving image data controlled by a computer program executed on the processing unit of the moving image coding apparatus according to an exemplary embodiment.

FIG. 6 illustrates a coding processing for the moving image data controlled by a computer program executed on the processing unit 13 of the moving image coding apparatus 1. It should be noted that the flow chart shown in FIG. 6 represents a processing on the respective macro blocks of one picture. While the moving image data which is the coding target continues, the moving image coding apparatus 1 executes the procedure of the coding processing shown in FIG. 6 for each picture.

As shown in FIG. 6, when the moving image coding apparatus 1 obtains via the moving image data the signal obtaining unit 11, the processing unit 13 starts the coding processing. The processing unit 13 determines whether the current picture is the I-picture (operation S201). Upon the current picture is the I-picture, (operation S201—Yes), the intra-prediction image generation unit 31 of the processing unit 13 creates the prediction image from the already coded macro block adjacent to the macro block which is the coding target (operation S202). The intra-prediction image generation unit 31 passes the created prediction image to the prediction image selection unit 32 of the processing unit 13. The prediction image selection unit 32 may select the prediction image based on the adjacent macro block created by the intra-prediction image generation unit 31 and passes the selected prediction image to the prediction error signal generation unit 21 of the processing unit 13 (operation S203).

On the other hand, in operation S201, upon the current picture is the P-picture (operation S201—No), the motion vector calculation unit 29 of the processing unit 13 calculates the motion vector of the macro block (operation S204). As described above, the motion vector calculation unit 29 can calculate the motion vector through the block matching between the macro block and the reference picture stored in the decode image storage unit 28. It should be noted that with regard to the processing in operation S204, the motion vector calculation unit 29 calculates the motion vectors for all the macro blocks included in the current picture when the coding processing on the first macro block is executed. This is because in the decision processing for the quantization parameter in operation S209, the motion vectors of all the macro blocks are used. Instead, the processing unit 13 omits the processing in operation S204 for the second and subsequent macro blocks. The motion vector calculation unit 29 passes the calculated motion vector to the inter-prediction image generation unit 30, the picture information amount control unit 33, and the coding unit 24 of the processing unit 13, respectively.

Next, the inter-prediction image generation unit 30 subjects the reference picture to the motion compensation by the motion vector to create the prediction image (operation S205). The inter-prediction image generation unit 30 passes the created prediction image to the prediction image selection unit 32. The prediction image selection unit 32 may select the prediction image based on the previous picture created by the inter-prediction image generation unit 30 and passes the selected prediction image to the prediction error signal generation unit 21 (operation S206).

After operation S203 or S206, the prediction error signal generation unit 21 generates the prediction error signal due to the difference between the macro block of the coding target and the prediction image (operation S207). The prediction error signal generation unit 21 passes the generated prediction error signal to the orthogonal transform unit 22 of the processing unit 13. The orthogonal transform unit 22 subjects the received prediction error signal to the orthogonal transform processing to calculate the frequency signal (operation S208). The orthogonal transform unit 22 passes this frequency signal to the quantization unit 23 of the processing unit 13.

On the other hand, the picture information amount control unit 33 decides the quantization parameter Based on the motion vector received from the motion vector calculation unit 29 (operation S209). The picture information amount control unit 33 decides the quantization parameter while following the procedure shown in the flow chart of FIG. 5 upon the current picture is the P-picture. The picture information amount control unit 33 passes the quantization parameter to the quantization unit 23.

The quantization unit 23 quantizes the frequency signal received from the orthogonal transform unit 22 while following the quantization parameter received from the picture information amount control unit 33 (operation S210). The quantization unit 23 passes the quantized frequency signal to the coding unit 24 and the inverse quantization unit 25 of the processing unit 13.

The coding unit 24 subjects the quantized frequency signal to the variable length coding to generate the coded signal related to the macro block which is the coding target (operation S211). The coding unit 24 outputs the coded signal.

On the other hand, the inverse quantization unit 25 subjects the quantized frequency signal to the inverse quantization to calculate the frequency signal (operation S212). The inverse quantization unit 25 passes the calculated frequency signal to the inverse orthogonal transform unit 26 of the processing unit 13. The inverse orthogonal transform unit 26 subjects the frequency signal received from the inverse quantization unit 25 to the inverse orthogonal transform to reproduce the prediction error signal related to the macro block which is the coding target (operation S213). The inverse orthogonal transform unit 26 passes the reproduced prediction error signal to the decode image generation unit 27 of the processing unit 13. The decode image generation unit 27 adds the reproduced prediction error signal to the prediction image used when the prediction error signal is calculated to generate the reference picture in unit of block (operation S214). The decode image generation unit 27 may store the reference picture in the decode image storage unit 28 of the processing unit 13.

The processing unit 13 repeatedly carries out the above-mentioned processing to generate the coded signal for each macro block of the respective pictures. The processing unit 13 adds predetermined header information to the coded signals and also arranges the coded signals while following a predetermined format to create the data stream including the coded moving image data.

It should be noted that the moving image data coded by the moving image coding apparatus 1 can be data conforming to, for example, H.264 MPEG-4 AVC. The moving image data coded by the moving image coding apparatus 1 can be decoded by a moving image decoding apparatus in a related art.

As described above, this moving image coding apparatus increases the number of coding bits allocated to the P-picture located at the second half in the GOP with respect to the P-picture of the same field as the I-picture and decreases the P-picture of the field different from the I-picture. According to this, this moving image coding apparatus can create the P-picture having the small image quality degradation every other picture, so that while keeping the bit rate over the entire GOP constant, the subjective image quality of the viewer can be improved. Also, in the first half of the GOP where the image quality degradation of the P-picture is relatively small, for the generation of the prediction error signal, even when either of the top field or the bottom field is set as the reference picture, the error is small. For that reason, this moving image coding apparatus adjusts such an allocating number of coding bits for only the second half in the GOP, so that while suppressing the error generated in the first half in the GOP, the subjective image quality can be maintained in the second half where the coding error becomes large. For that reason, this moving image coding apparatus can suppress the sudden change in the image quality between the P-picture of the same field as the I-picture and the I-picture located at the lead-in of the next GOP.

Therefore, this moving image coding apparatus can suppress the generation of flicker in the decoded moving image data decoded from the moving image data which has been coded by this moving image coding apparatus.

It should be noted that the present invention is not limited to the above-mentioned embodiments. For example, the processing unit may switch the order of the processing in operation S209 and the processing in operations S202 and S203 or operations S205 and S206 and operations S207 and S208 in the flow chart shown in FIG. 6. Furthermore, the processing unit may switch the order of the processing in operation S211 and the processing in operations S212 to S214 in the flow chart shown in FIG. 6.

The picture information amount control unit may use the PSNR calculated from the reference picture and the original picture corresponding to the reference picture as a determination reference on whether the target information amount T is increased or decreased by using the correction information amount ΔT. In this case, in operation S104 in the flow chart shown in FIG. 5, instead of comparing the remaining number Np of the P-pictures with the predetermined threshold ThN, the picture information amount control unit determines whether the PSNR obtained for the picture before the current picture by one picture is lower than a predetermined threshold Thp. The picture information amount control unit executes the processing operation S105 and subsequent operations upon the PSNR is lower than the threshold Thp and on the other hand executes the processing in operation S109 upon the PSNR is equal to or larger than the threshold Thp.

It should be noted that the PSNR is calculated, for example, while following the expression described below.

$$PSNR = 10\log\frac{\sum_{i=1}^{N_{pix}} p_i^2}{\sum_{i=1}^{N_{pix}} (p_i - p_i')^2} \quad (9)$$

Where Npix denotes a total number of pixels included in the picture. Also, p'i denotes a pixel value of the i-th pixel of the original picture. On the other hand, p'i denotes a pixel value of the i-th pixel of the reference picture stored in the decode image storage unit corresponding to the original picture.

The threshold Thp may be set as the minimum value of the PSNR value at which the viewer does not recognized that the image quality of the P-picture is degraded as compared with the image quality of the I-picture in the GOP when the viewer views the respective pictures in the GOP of interest as the moving image. For example, the threshold Thp can be a value obtained by multiplying the PSNR value calculated for the I-picture of the GOP of interest by 0.7 or 0.8.

Furthermore, the picture information amount control unit may set the correction information amount $\Delta T$ constant. For example, the picture information amount control unit may obtain the correction information amount $\Delta T$ by setting Np=0 irrespective of the remaining number of the non-coded P-picture in the expression (5).

The picture information amount control unit may decide the quantization parameter so that the P-picture having the small image quality degradation is arranged every other picture also for the GOP corresponding to the scene without a motion. The picture information amount control unit omits the processing in operations S101 and S102 in the flow chart shown in FIG. 5. That is, the picture information amount control unit may decide the target information amount T irrespective of the determination result on whether the picture is the picture corresponding to the scene with the motion. In this case, as the picture motion amount calculation unit and the motion determination unit are omitted, the picture information amount control unit can reduce the computation amount for calculating the quantization parameter.

Furthermore, a cycle of the P-picture where the more number of coding bits is allocated is not limited to every other picture. The picture information amount control unit can set the cycle of the P-picture where the more number of coding bits is allocated as long as the decrease in the subjective image quality for the user is permissible. For example, the picture information amount control unit may set the large target information amount T1 for one picture of the continuous three P-pictures and set the small target information amount T2 for the other two pictures. The picture information amount control unit sets the target information amount T1 as a value obtained by adding the basic target information amount Tp for the P-picture with the correction information amount $\Delta T$ obtained Based on the expression (5). On the other hand, the picture information amount control unit sets the target information amount T2 as a value obtained by subtracting ½ of the correction information amount $\Delta T$ Based on the expression (5) from the basic target information amount Tp for the P-picture. The picture information amount control unit may set the large target information amount T1 for two pictures among the continuous three P-pictures and set the small target information amount T2 for the other picture. The picture information amount control unit sets the target information amount T1 as a value obtained by adding the basic target information amount Tp with ½ of the correction information amount $\Delta T$ Based on the expression (5). On the other hand, the picture information amount control unit sets the target information amount T2 as a value obtained by subtracting the correction information amount $\Delta T$ Based on the expression (5) from the basic target information amount Tp.

Upon the cycle of the P-picture where the large number of coding bits are allocated is not every other picture, the picture information amount control unit determines whether the position in the GOP of the current picture is a position corresponding to a predetermined cycle shorter than the number of pictures in the GOP in operation S106 in the flow chart shown in FIG. 5.

Also, upon the respective pictures included in the moving image data to be coded are the frame, the picture information amount control unit may determines whether the position in the GOP of the current picture is the position corresponding to the above-mentioned predetermined cycle in the GOP in operation S106 in the flow chart shown in FIG. 5. When the position in the GOP of the current picture is the position corresponding to the above-mentioned predetermined cycle, the picture information amount control unit executes the processing in operation S107. On the other hand, when the position in the GOP of the current picture is not the position corresponding to the above-mentioned predetermined cycle, the picture information amount control unit executes the processing in operation S108.

The GOP of the moving image data to be coded by this image coding apparatus may include the B-picture. For example, upon the GOP has a plurality of sets of pictures including continuous two B-pictures and one P-picture, the picture information amount control unit may decrease the target information amount for any one of the B-pictures by a predetermined amount and increase the target information amount for the other B-picture by the predetermined amount. The predetermined amount can be set as, for example, 10% or 20% of the basic target information amount Tb for the B-picture obtained from the expression (6).

This image coding apparatus may be utilized in various applications. For example, this image coding apparatus being incorporated in a video camera, a video transmission apparatus, a TV telephone system, a computer, or a mobile phone device. For example, upon this image coding apparatus being incorporated in the video transmission apparatus, the coded moving image data created by this moving image coding apparatus is transformed into a data stream following a predetermined communication standard by a processing unit thereof together with other signals obtained at the same time with the moving image data such as an audio signal. The video transmission apparatus in which the image coding apparatus is incorporated transmits the data stream via an antenna connected to an output unit or via a communication line to a moving image decoding apparatus installed at a remote place.

An exemplary embodiment of a moving image coding apparatus and the moving image coding method attain the effect that the subjective image quality of the viewer with respect to the decoded moving image data can be improved by suppressing the flicker noise generated in unit of GOP.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A moving image coding apparatus, comprising:
a memory; and
a processor configured to execute a procedure in the memory, the procedure including
a process configured to perform coding moving image data by inter-coding or intra-coding each of a plurality of continuous pictures included in a set of pictures included in the moving image data,
an information amount control process configured to determine a quantization parameter for the coding in such a manner that while a lead-in of the set of the pictures is set as a reference,
upon a position of an inter-coded picture being after a predetermined position where a coding error due to the inter-coding falls within a permissible range when the number of coding bits is equally allocated to the respective pictures included in the set of the pictures and also corresponds to a first position at a predetermined cycle shorter than the number of pictures included in the set of the pictures, the number of coding bits allocated to the inter-coded picture is a value obtained by adding a first predetermined amount to a predetermined reference value, and
upon the position of the inter-coded picture being after the predetermined position and also is at a second position different from the first position, the number of coding bits is a value obtained by subtracting a second predetermined amount from the reference value,
wherein the first position and the second position are after the predetermined position where the coding error due to the inter-coding falls within the permissible range, and
a motion vector calculation process configured to
execute block matching between a macro block of interest of the inter-coded picture and the respective pictures included in the set of pictures to obtain a cost with respect to the macro block and respective positions of the respective pictures included in the set of pictures,
select which block of one of the respective pictures cost is smallest,
set a difference between a position of the macro block of interest in a horizontal direction and the obtained position of the selected block of the respective pictures in the horizontal direction as a moving amount in the horizontal direction,
set a difference between the position of the macro block of interest in the vertical direction and the obtained position of the selected block of the respective pictures in the vertical direction as a moving amount in the vertical direction, and
set as the motion vector a vector which uses the moving amount in the horizontal direction, the moving amount in the vertical direction, and identification information representing the selected reference picture as elements.

2. The moving image coding apparatus according to claim 1,
wherein the predetermined position is a position where half of the number of inter-coded pictures included in the set of pictures is added to the lead-in position of the set of pictures.

3. The moving image coding apparatus according to claim 1,
wherein the predetermined position is a position where an image quality degradation degree due to the coding for the picture immediately before the inter-coded picture is decreased than the image quality degradation degree of the intra-coded picture included in the set of pictures by a predetermined degree.

4. The moving image coding apparatus according to claim 1,
wherein the information amount control process sets the quantization parameter in such a manner that, as being closer to a rear end of the set of pictures, the number of coding bits allocated to the inter-coded picture at the first position is increased and sets the quantization parameter in such a manner that as being closer to the rear end of set of pictures, the number of coding bits allocated to the inter-coded picture at the second position is decreased.

5. The moving image coding apparatus according to claim 1,
wherein the set of pictures alternately includes a top field and a bottom field as the continuous pictures, and
the information amount control process sets the predetermined cycle in such a manner that the picture of the same field as the field of the intra-coded picture is arranged at the first position.

6. The moving image coding apparatus according to claim 1,
wherein the procedure includes a motion detection process configured to detect a moving amount from the similar area of temporally subsequent and previous pictures for the respective blocks of the inter-coded picture, and
wherein, upon a scene corresponding to the inter-coded picture is a stationary scene from a statistics value of the moving amount of the respective blocks, the information amount control process sets the first predetermined amount and the second predetermined amount as zero.

7. A moving image coding method comprising:
coding moving image data by inter-coding or intra-coding each of a plurality of continuous pictures included in a set of pictures included in the moving image data;
determining a quantization parameter for the coding in such a manner that while a lead-in of the set of the pictures is set as a reference, upon a position of an inter-coded picture being after a predetermined position where a coding error due to the inter-coding falls within a permissible range when the number of coding bits is equally allocated to the respective pictures included in the set of the pictures and also corresponds to a first position at a predetermined cycle shorter than the number of pictures included in the set of the pictures, the number of coding bits allocated to the inter-coded picture is a value obtained by adding a first predetermined amount to a predetermined reference value, and upon the position of the inter-coded picture being after the predetermined position and also is at a second position different from the first position, the number of coding bits is a value obtained by subtracting a second predetermined amount from the reference value, wherein the first position and the second position are after the predetermined position where the coding error due to the inter-coding falls within the permissible range, and calculating a motion vector by
executing block matching between a macro block of interest of the inter-coded picture and the respective pictures included in the set of pictures to obtain a cost with respect to the macro block and respective positions of the respective pictures included in the set of pictures, selecting which block of one of the respective pictures cost is smallest, setting a difference between a position of the macro block of interest in a horizontal direction and the obtained position of the selected block of the respective pictures in the horizontal direction as a moving amount in the horizontal direction, setting a difference between the position of the macro block of interest in the vertical direction and the obtained position of the selected block of the respective pictures in the vertical direction as a moving amount in the vertical direction, and setting as the motion vector a vector which uses the moving amount in the horizontal direction, the moving amount in the vertical direction, and identification information representing the selected reference picture as elements.

8. The moving image coding apparatus according to claim 1, wherein the procedure includes
a prediction error signal generation process configured to divide the respective pictures included in the set of the pictures into a plurality of blocks, and configured to generate a prediction error signal representing an error for each of the respective divided blocks with a corresponding block in a temporally adjacent picture of the respective picture or with another block in the respective picture,
an orthogonal transform process configured to generate a frequency signal by subjecting the prediction error signal to an orthogonal transform,
a quantization process configured to quantize the frequency signal while following the quantization parameter, and
a coding process configured to subject the quantized frequency signal to a variable length coding.

9. The moving image coding method according to claim 7, further comprising:
dividing the respective pictures included in the set of the pictures into a plurality of blocks and generating a prediction error signal representing an error for each of the respective divided blocks with a corresponding block in a temporally adjacent picture of the respective picture or with another block in the respective picture;
generating a frequency signal by subjecting the prediction error signal to an orthogonal transform;
quantizing the frequency signal while following the quantization parameter; and
subjecting the quantized frequency signal to a variable length coding.

10. A coding circuit of coding by inter-coding or intra-coding each of a plurality of continuous pictures included in a set of pictures, the coding circuit comprising:
a memory; and
a processor configured to execute a procedure in the memory, the procedure including
a control process configured to control a number of coding bits allocated to an inter-coded picture included in the set of pictures, a position of the inter-coded picture being after a predetermined position where a coding error due to the inter-coding falls within a permissible range when the number of coding bits is equally allocated to the respective pictures included in the set of the pictures, by increasing or decreasing the number of coding bits in cyclic,
wherein the control process controls the number of coding bits by adding a first amount to a reference value, when the position of the inter-coded picture corresponds to a first position at a cycle shorter than a number of pictures included in the set of the pictures, and by subtracting a second amount from the reference value, when the position of the inter-coded picture corresponds to a second position different from the first position,
wherein the first position and the second position are after the predetermined position where the coding error due to the inter-coding falls within the permissible range, and
a motion vector calculation process configured to
execute block matching between a macro block of interest of the inter-coded picture and the respective pictures included in the set of pictures to obtain a cost with respect to the macro block and respective positions of the respective pictures included in the set of pictures,
select which block of one of the respective pictures cost is smallest,
set a difference between a position of the macro block of interest in a horizontal direction and the obtained position of the selected block of the respective pictures in the horizontal direction as a moving amount in the horizontal direction,
set a difference between the position of the macro block of interest in the vertical direction and the obtained position of the selected block of the respective pictures in the vertical direction as a moving amount in the vertical direction, and
set as the motion vector a vector which uses the moving amount in the horizontal direction, the moving amount in the vertical direction, and identification information representing the selected reference picture as elements.

11. A coding method comprising:
coding, executed by a processor, by inter-coding or intra-coding, each of a plurality of continuous pictures included in a set of pictures;

controlling a number of coding bits allocated to an inter-coded picture included in the set of pictures, a position of the inter-coded picture being after a predetermined position where a coding error due to the inter-coding falls within a permissible range when the number of coding bits is equally allocated to the respective pictures included in the set of the pictures, by increasing or decreasing the number of coding bits in cyclic,     wherein the controlling controls the number of coding bits by adding a first amount to a reference value, when the position of the inter-coded picture corresponds to a first position at a cycle shorter than a number of pictures included in the set of the pictures, and by subtracting a second amount from the reference value, when the position of the inter-coded picture corresponds to a second position different from the first position,     wherein the first position and the second position are after the predetermined position where the coding error due to the inter-coding falls within the permissible range, and calculating a motion vector by     executing block matching between a macro block of interest of the inter-coded picture and the respective pictures included in the set of pictures to obtain a cost with respect to the macro block and respective positions of the respective pictures included in the set of pictures, selecting which block of one of the respective pictures cost is smallest, setting a difference between a position of the macro block of interest in a horizontal direction and the obtained position of the selected block of the respective pictures in the horizontal direction as a moving amount in the horizontal direction, setting a difference between the position of the macro block of interest in the vertical direction and the obtained position of the selected block of the respective pictures in the vertical direction as a moving amount in the vertical direction, and setting as the motion vector a vector which uses the moving amount in the horizontal direction, the moving amount in the vertical direction, and identification information representing the selected reference picture as elements.

\* \* \* \* \*